TRAVELING WAVE MASER USING RECTANGULAR FINGERS WITH SPACERS, COMPOSITE MASER SLAB, AND BROADBAND ISOLATION

Filed Sept. 12, 1962

INVENTORS: F. S. CHEN
M. L. HENSEL
B. C. HIATT
E. O. SHULZ - DU BOIS
BY Sylvan Sherman
ATTORNEY INVENTORS: F. S. CHEN
M. L. HENSEL
B. C. HIATT
E. O. SHULZ - DU BOIS
BY Sylvan Sherman
ATTORNEY Oct. 26, 1965 FANG-SHANG CHEN ETAL 3,214,701

TRAVELING WAVE MASER USING RECTANGULAR FINGERS WITH SPACERS, COMPOSITE MASER SLAB, AND BROADBAND ISOLATION

Filed Sept. 12, 1962 4 Sheets-Sheet 3

INVENTORS: F. S. CHEN
M. L. HENSEL
B. C. HIATT
E. O. SHULZ-DU BOIS

BY Sylvan Sherman
ATTORNEY

INVENTORS: F. S. CHEN
M. L. HENSEL
B. C. HIATT
E. O. SHULZ-DU BOIS
BY Sylvan Sherman
ATTORNEY 3,214,701

TRAVELING WAVE MASER USING RECTANGULAR FINGERS WITH SPACERS, COMPOSITE MASER SLAB, AND BROADBAND ISOLATION

Fang-Shang Chen and Marion L. Hensel, Summit, N.J., Benjamin C. Hiatt, Bethlehem, Pa., and Erich O. Schulz-Du Bois, Oldwick, N.J.; said Chen, Hensel, and Schulz-Du Bois assignors to Bell Telephone Laboratories Incorporated, New York, N.Y., a corporation of New York, and said Hiatt assignor to Western Electric Company Incorporated, New York, N.Y., a corporation of New York Filed Sept. 12, 1962, Ser. No. 223,585
5 Claims. (Cl. 330—4)

This invention relates to electromagnetic wave transmission devices and, in particular, to devices in which amplification occurs by the stimulated emission of radiation from solid state media in propagating structures. Such devices are now generally termed traveling wave masers.

In United States Patent 3,004,225, issued to R. W. De Grasse and E. O. Schulz-Du Bois on October 10, 1961, and in the copending application by E. O. Schulz-Du Bois and W. J. Tabor, Serial No. 120,675, filed June 21, 1961, there is described a type of traveling wave master comprising a slow-wave, comb-like structure suitably loaded with an active material to produce stimulated emission of radiation at the signal frequency. In addition, nonreciprocal loss is included to increase the stability of operation by means of gyromagnetic material distributed along the wave path.

Devices of the type described in the above-mentioned patent and copending application have been successfully operated at X-band and L-band. However, experience has revealed a number of practical mechanical and electrical limitations, leaving room for additional improvements in such devices. For example, differential thermal contraction between the active material, such as ruby, and the copper wave-guide walls is such that equal lengths of ruby and copper at room temperature, will differ substantially when cooled for operation at liquid helium temperature. More specifically, the copper will be smaller than the ruby material. In a maser, where two ruby slabs are spring loaded against the comb fingers, the effect of this unequal contraction is to distort the comb fingers. The details of this distortion depend upon the essentially accidental distribution of friction over the contact area between the individual fingers and the ruby slab and, hence, can neither be predicted nor readily controlled. The result is to produce excessive insertion losses and irregularities in the frequency response.

A second related effect of the thermal contraction and expansion with temperature is the "walking" away of the maser material with respect to the comb structure as the temperature is cycled a few times. Walking over small distances is undesirable as it tends to deteriorate the frequency response. Walking over large distances disintegrates the maser completely.

It is, accordingly, an object of this invention to securely fix the relative positions of the active maser material and the slow-wave structure in a traveling wave maser amplifier.

It is a more specific object of this invention to maintain the relative position of the maser material and the slow-wave structure of a maser amplifier fixed over a broad range of operating temperatures.

A second area in which improvement is sought is in the gain of the amplifier. To achieve added gain, it is necessary to further reduce the group velocity of the signal. This is equivalent to narrowing the pass band of the slow-wave structure. As pointed out in the copending application of E. O. Schulz-Du Bois referred to above, attempts to narrow the pass band frequently produce an undesirable condition known as "foldover." Such a condition renders a maser completely useless and should be avoided.

It is, therefore, a further object of this invention to narrow the pass band of the slow-wave comb structure used in a traveling wave maser.

Concurrently with narrowing the pass band of the slow-wave structure to increase gain, attempts have been made to increase the amplifier gain by increasing the bandwidth over which the maser material will efficiently produce stimulated emission. At present, the ruby maser material is oriented with its *c*-axis perpendicular to the direction of the D.-C. magnetic field. This permits the *c*-axis to assume all directions in a plane perpendicular to the plane of the comb structure. Two extreme cases that are of interest are those of 0 degree and 90 degree *c*-axis orientations.

The so-called 0 degree material, when used in a forward wave structure, has been observed to give high gain at the low frequency end of the pass band where the high frequency fields extend relatively far away from the comb fingers. By comparison, the 90 degree material is observed to give considerably higher gain at the high frequency end of the pass band where the high frequency fields are concentrated near the comb fingers.

(The above discussion also applied to a backward wave type structure except that the high and low frequency field conditions are interchanged making the 0 degree material better over the high frequency portion of the structure while the 90 degree material becomes better over the low frequency portion.)

It is, accordingly, an additional object of the invention to achieve high gain over the entire pass band of a traveling wave maser by the use of a composite element of 0 degree and 90 degree maser material.

Because the maser gain tends to be considerable in either direction of propagation, and because the various measures taken to increase the maser gain have been successful, it has become increasingly important that the isolator incorporated into the amplifier structure provided adequate and essentially equal amounts of reverse attenuation over as large a fraction of the total pass band as possible.

It is, thus, a further object of the invention to increase the bandwidth of the isolator used in a traveling wave maser.

In accordance with the teachings of the invention the several objectives enumerated above are fulfilled in one illustrative embodiment of an improved traveling wave maser as follows:

(1) Finger uniformity is realized by bonding ceramic spacers to an end of one of the maser slabs. The spacers and the metallic fingers of the slow-wave structure are interleaved so that the spaces between adjacent comb fingers are maintained equal over wide ranges of operating temperatures. Typically the spacers are made of alumina and the maser material is ruby. Since alumina is coexpansive with the ruby, at low temperatures the metallic fingers are spread like a fan. However, because of the spacers the resulting structure distorts uniformly. Hence, the finger-to-finger impedances remain equal, thereby maintaining a low insertion loss and a smooth frequency response.

In an alternate arrangement, a groove is machined into the maser slab along a region where it contacts the finger ends. A plastic thread of a somewhat larger cross section is laid into the groove. When the comb fingers are pressed against the plastic thread, indentations are formed. The ridges adjacent to the indentations serve to keep the comb fingers equally spaced as the maser is cooled to liquid helium temperature.

(2) When a second maser slab is used, the latter is prevented from walking by bonding ceramic blocks along the middle portion of the second slab. The blocks are snugly received between adjacent fingers and lock the slab in position relative to the slow-wave comb structure.

(3) Narrowing of the comb structure pass band is achieved by altering the cross-sectional dimensions of the comb fingers from that of a square to that of a rectangle. The wide dimension, which extends in the direction of wave propagation, and the center-to-center spacing of the fingers remains essentially the same. However, the narrow dimension which is essentially the dimension between slabs is typically reduced to below 80 percent of the wide dimension.

(4) Broadbanding of the maser gain is realized by means of a composite slab of maser material constructed partially of 0 degree maser material and partially of 90 degree maser material. More specifically, the outer portion of the slab is made of 0 degree material. The portion of the slab immediately adjacent to the comb fingers is made of 90 degree material where the proportion of 90 degree material to the total slab volume ranges between 5 and 35 percent.

(5) Broadband isolation is obtained by varying the spacing between the comb fingers and the gyromagnetic material. It has been discovered that comparatively large spacing gives good reverse attenuation near the low end of the pass band whereas close spacing gives best reverse attenuation near the high end. Accordingly, an isolator strip of large to medium spacing is combined with an isolator strip of smaller spacing to achieve higher reverse attenuation over a broad frequency band while still maintaining a low forward loss.

It should be noted that whereas optimum performance is realized by combining all of the above-described features in a traveling wave maser amplifier, the various features are, however, mutually independent and, hence, can be separately utilized as required. Thus, in a narrow band amplifier the broadbanding features of the isolator may not be necessary whereas uniform finger spacing and anti-walking measures may still be required for good low temperature operation.

These and other objects and advantages, the nature of the present invention, and its various features, will appear more fully upon consideration of the various illustrative embodiments now to be described in detail in connection with the accompanying drawings, in which.

Figures 1, 1A:
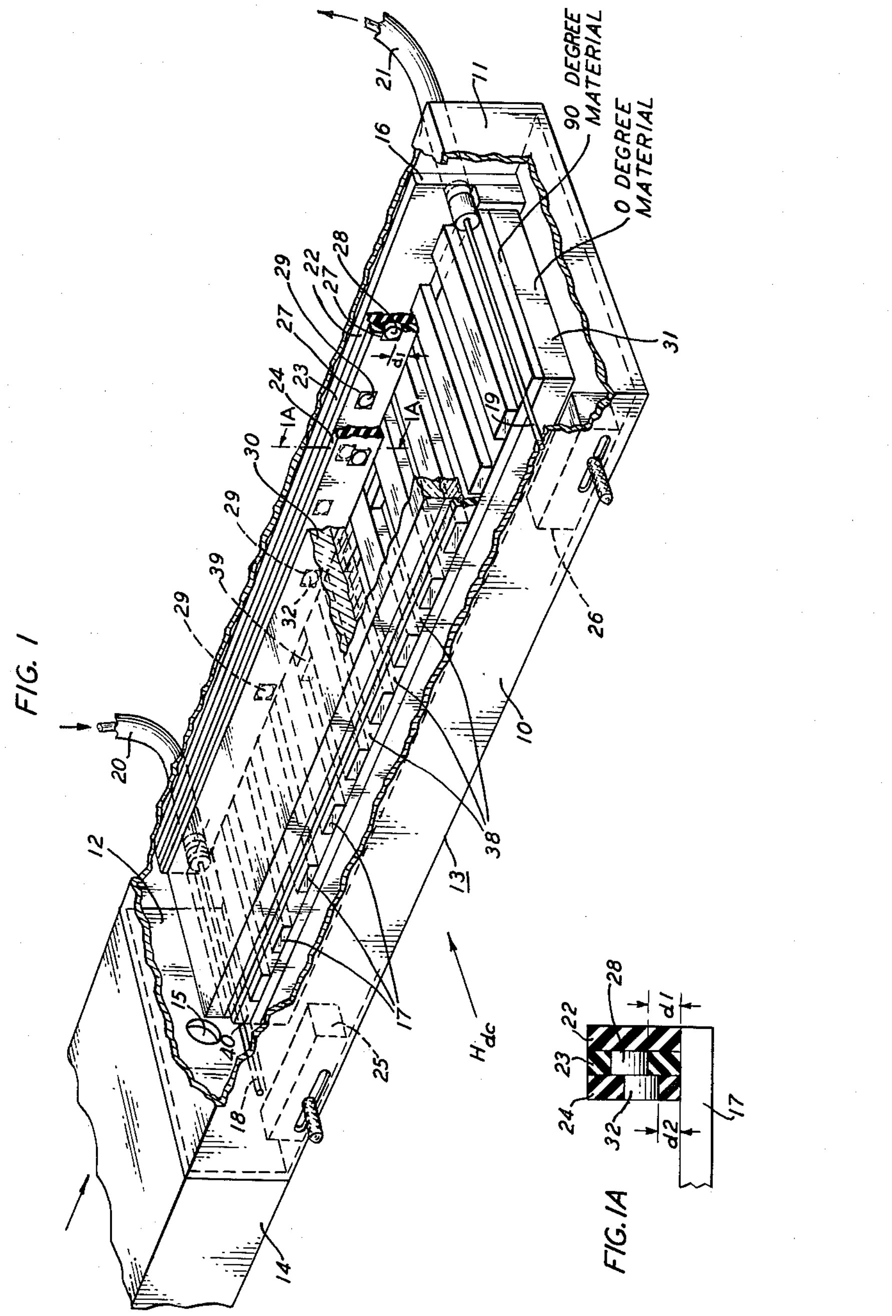
FIG. 1 shows, in perspective, a preferred embodiment of the invention.
FIG. 1A shows the isolator arrangement.

Referring to FIG. 1, there is shown a specific illustrative embodiment of a traveling wave maser, in accordance with the teachings of the invention, incorporating the various improvements referred to hereinabove. Basically, the amplifier is similar to that described in the abovementioned De Grasse et al. patent and in the Schulz-Du Bois et al. copending application. It comprises a length of rectangular waveguide 10 terminated at respective ends by means of transverse conductive members 11 and 12. The resulting cavity 13 is proportioned to support a standing wave at the pumping frequency. Pumping power is derived from a pumping generator (not shown) by way of a waveguide 14 and is coupled to cavity 13 through an aperture 15 in member 12.

The slow-wave comb structure comprises a conductive base member 16 (disposed within cavity 13) along which there is mounted an array of conductive posts or fingers 17 of rectangular cross section which are orthogonally disposed with respect to the longitudinal axis of the section of rectangular waveguide 10. Posts 17 which are, advantageously, copper plated tungsten rods are conductively secured to the base member 16. Typically, this can be done by soldering or brazing. The base member 16, in turn, is disposed contiguous to one of the narrow walls of waveguide 10. Alternatively, posts 17 can be secured directly in one of the narrow walls of guide 10.

Signal power is applied to the slow-wave structure and extracted therefrom by means of impedance matching networks of the type described in the copending application of J. M. Apgar, Serial No. 120,674, filed June 29, 1961. The networks comprise the end posts 18 and 19 which are, respectively, the extensions of the center conductors of the two coaxial transmission lines 20 and 21. Line 20 serves as an input path for a signal wave which is to be amplified and line 21 serves to abstract from the device an amplified replica of the signal wave. The posts 18 and 19 extend across cavity 13 in a direction parallel to the comb fingers and are conductively connected to the opposite narrow wall thereof. The distance between each of the end posts 18 and 19 and the next adjacent comb finger is equal to the finger-to-finger spacing of the comb structure. Movable blocks 25 and 26 are provided adjacent the end posts for fine adjustments of the impedance match.

Situated between the array of posts and the upper and lower wide walls of guide 10 are a pair of composite slabs 30 and 31 of active material whose particular properties will be described in greater detail hereinafter. Various paramagnetic salts are suitable for use as the active or negative temperature material of maser devices of the general type described herein. The general nature of these materials is described in an article published by N. Bloembergen in the Physical Review, volume 104, No. 2, pages 324 through 377, entitled "Proposal for a New Type Solid State Maser." As a specific example, the principles of the present invention can be embodied in devices having as the negative temperature material aluminum oxide which has an impurity content of approximately one-thirtieth of one percent of the trivalent chromium. Materials of this type, referred to as "ruby" materials, are described in an article by De Grasse et al. entitled "The Three-Level Solid State Traveling-Wave Maser," published in the March 1959 Bell System Technical Journal at pages 305 to 334. More generally, however, any material capable of amplifying a signal wave by the stimulated emission of wave energy can be used. These materials, whatever their composition, will be referred to hereinafter either as the "active material," the "maser material" or the "maser slab."

Finger spacing uniformity, in accordance with the invention, is obtained by bonding a plurality of spacers 38 to the end of slab 30 nearest the open-circuited end of fingers 17. As shown, the spacers 38 are located between adjacent fingers of the slow-wave structure and are equal in width to the finger-to-finger spacing at room temperature. In addition to maintaining uniform finger spacing, the spacers prevent any relative motion between the slab 30 and the slow-wave structure and hence prevent walking to the maser material.

When a second slab of maser material, such as slab 31, is used, walking of the second slab is prevented by bonding a number of spacers 39 to the surface of the second slab adjacent to the slow-wave structure. These are preferably located near the short-circuited end of the fingers 17 where the latter are mechanically supported at the waveguide wall.

Because the gain through the amplifier in the reverse direction is appreciable, nonreciprocal loss is preferably included in the amplifier or stability. Such loss is provided by a gyromagnetic isolator incorporated directly into the amplifier structure. In the embodiment of FIG. 1 the isolator comprises three ceramic members 22, 23 and 24. The first, a ceramic spacer 22, is located adjacent to the base member 16 (or adjacent to the narrow wall of guide 10 in the event a separate base member is omitted and the posts 17 are mounted directly in the narrow guide wall). Spacer 22 extends longitudinally along cavity 13 the entire length of the slow-wave structure. Situated immediately adjacent spacer 22 is the second ceramic member 23 which also extends longitudinally substantially the entire length of the slow-wave structure. The member 23 is supplied with a plurality of apertures 27 (which are shown as squares in the embodiment of FIG. 1), into which there are inserted flat disks of gyromagnetic material 28.

The term "gyromagnetic material" is employed here in its accepted sense as designating the class of magnetically polarizable materials having unpaired spin systems involving portions of the atoms thereof that are capable of being aligned by an external magnetic polarizing field and which exhibit a precessional motion at a frequency within the range contemplated by the invention under the combined influence of said polarizing field and an orthogonally directed varying magnetic field component. This precessional motion is characterized as having an angular frequency and a magnetic moment capable of interacting with suitable electromagnetic fields. Typical of such materials are paramagnetic materials and ferromagnetic materials, the latter including the spinels such as, magnesium aluminum ferrite, aluminum zinc ferrite and the rare earth iron oxides having a garnet-like structure of the formula $A_3B_5O_{12}$ where O is oxygen, A is at least one element selected from the group consisting of yttrium and the rare earths having an atomic number between 62 and 71, inclusive, and B is iron optionally containing at least one element selected from the group consisting of gallium, aluminum, scandium, indium and chromium.

The disks 28 in member 23 are located a distance $d_1$ from the comb fingers. Immediately adjacent to member 23 is the third ceramic member 24 in which there is a second group of apertures 29 (also shown as squares) into which there are also inserted flat disks of gyromagnetic material 32. The latter, however, are generally fewer in number than the disks 28 in member 23 and are located a distance $d_2$ from the comb fingers, where $d_2$ is less than $d_1$.

The arrangement of the two rows of gyromagnetic disks is shown more clearly in FIG. 1A which is a section taken along the axis of waveguide 10 in FIG. 1. FIG. 1A shows the fingers 17, members 22, 23 and 24 and the disks 28 spaced a distance $d_1$ from the fingers and the disks 32 spaced a smaller distance $d_2$ from the fingers.

The gyromagnetic material and the maser material are magnetically biased by means of a common steady magnetic field $H_{dc}$ (indicated by an arrow 36) directed parallel to the fingers 17. The source of this field is not shown. However, it is understood that field $H_{dc}$ can be supplied in any convenient manner well known in the art such as, for example, by using an electromagnet or a permanent magnet, and can, in addition, include means for varying the intensity of the field such as a potentiometer or a magnetic shunt.

Located below the comb structure is a second spacer 33 which extends longitudinally a distance equal to that of spacer 22 and which has a transverse dimension equal to the overall transverse dimension of member 22, 23 and 24. Spacer 33 is advantageously made of the same material as members 22, 23 and 24 and is inserted to maintain the symmetry of the amplifier structure although it can be eliminated and the lower slab 31 of maser material extended to fill the region below the isolator assembly.

Because a traveling wave maser is advantageously operated at low temperatures, the differential thermal contraction between the maser material and metallic waveguide has a pronounced effect upon its operating characteristics. In a maser of the type described herein, in which two maser slabs are spring loaded against the comb fingers, one effect of thermal contraction is to produce a distortion of the comb fingers.

Figure 2:
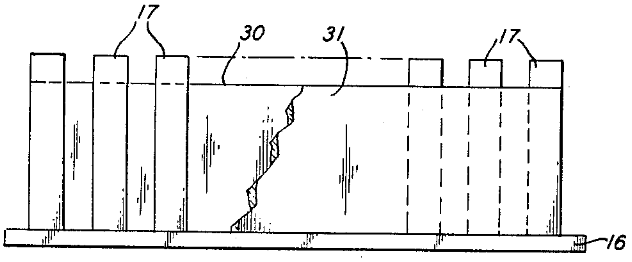
FIG. 2 shows the comb fingers and the maser material at room temperature.
Figure 3:
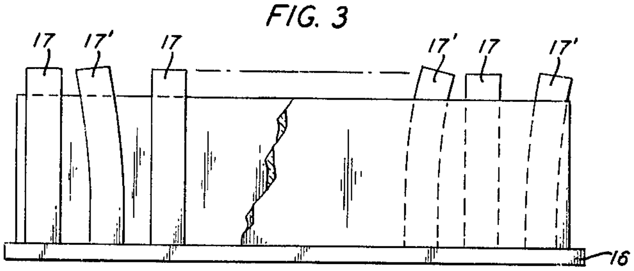
FIG. 3 shows the distorted comb fingers and the maser material at reduced temperature.

FIG. 2 shows the comb fingers 17 mounted in the metallic (copper) base member 16 and located between the two slabs 30 and 31 of maser (ruby) material. At room temperature, the slabs and the comb are of equal length. At reduced temperatures, such as that of liquid helium, however, the slabs are longer than the comb. Due to the relative motion of the slabs with respect to the comb (as a result of thermal contraction), some of the fingers 17' are bent outward. This is illustrated in FIG. 3. Bending occurs where the frictional forces between the slabs and the fingers are strong. The remaining fingers 17, located in a region of weak frictional forces, remain straight. Thus, as a result of the accidental distribution of frictional forces over the contact area between each of the fingers and the maser slabs, the fingers are unevenly spaced at the operating temperature. Such irregularities have been found to increase the insertion losses and to distort the frequency bandpass characteristic of the maser amplifier.

Figure 4:
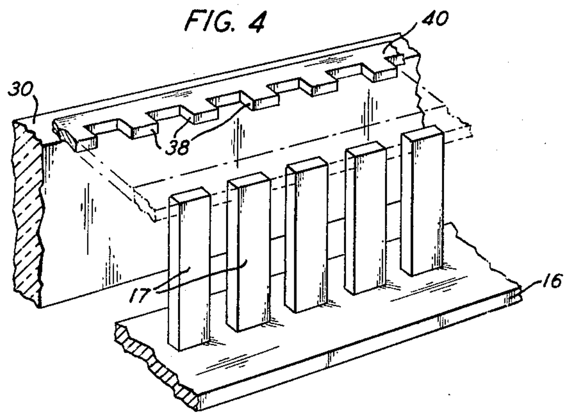
FIG. 4 shows the ceramic finger spacers bonded to the end of the maser material.
Figure 5:
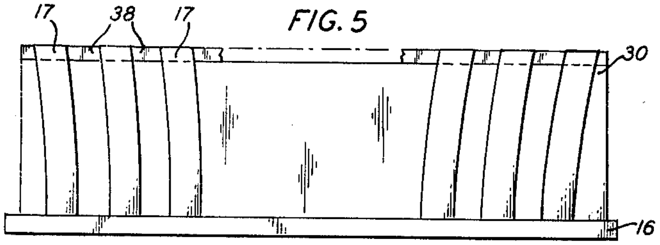
FIG. 5 shows the comb fingers and the maser material at reduced temperature with the finger spacers in place.

In the embodiment of FIG. 1, uniform finger spacing is assured by the ceramic spacers 38 placed between the open-circuited ends of the comb fingers. FIG. 4 is a close-up of this detail of the embodiment of FIG. 1 showing a portion of slab 30 and the spacer structure bonded thereto and ready for insertion between the comb fingers 17. In the embodiment illustrated in FIG. 4, the spacers 38 are the teeth of a ceramic comb 40. When ruby is used as the maser material, the ceramic comb 40 (and, hence, each of the spacers 38) is advantageously made of alumina, which is coexpansive with ruby. So constructed, the finger-to-finger spacing is maintained uniform by the ceramic comb inserted between adjacent fingers. At low temperatures, the comb fingers are spread somewhat like a fan as the ceramic spacers force the fingers to override the incidental frictional forces between the fingers and the maser material. The appearance of the comb at low temperatures with the spacers 38 in place is shown in FIG. 5. Though slightly distorted, the finger spacings are uniform and, hence, the insertion loss remains low and the frequency response remains smooth.

Experiments have demonstrated the improvements that can be achieved using finger spacers. Typical reductions in insertion loss of from 2 to 8 decibels over the useful part of the pass band have been realized in an L-band maser. In addition, the frequency response is now acceptable over a substantially larger fraction of the total bandwidth.

Figure 6:
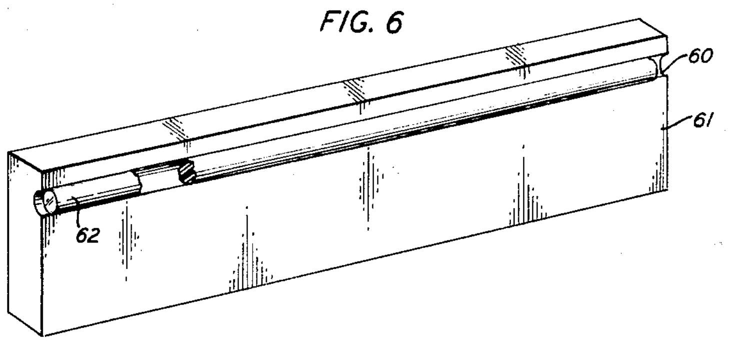
FIGS. 6 and 7 show an alternate arrangement for maintaining uniform finger spacing.
Figure 7:
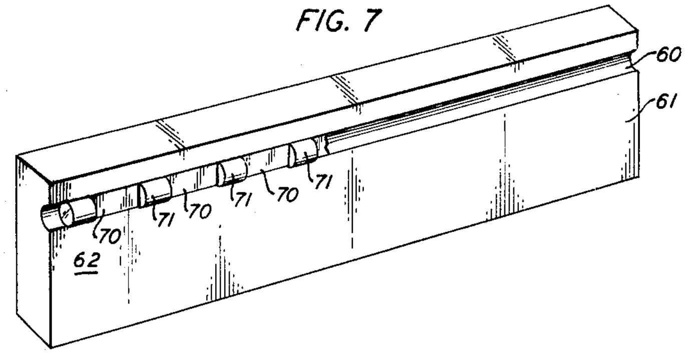

An alternative method for maintaining equal spacing between fingers is illustrated in FIGS. 6 and 7. As shown in FIG. 6, a groove 60 is machined into the maser slab 61 along the end of the broad surface in contact with the finger tips. A pliable material 62, such as a plastic thread of a somewhat larger cross section, is laid into the groove. When the comb fingers are pressed against the maser slab, indentations 70 are formed in the plastic thread 62 as shown in FIG. 7. The resulting ridges 71, thus formed, serve to keep the fingers equally spaced as the combination is cooled.

Each of the two techniques described above, in addition to maintaining uniform finger spacing, also serves to keep the relative positions of the comb structure and the maser slab fixed. In the absence of some such precaution, there is a tendency for the maser slab to walk with repeated temperature cycling. Thus, it is clear from FIGS. 1 and 4 that slab 30, with the ceramic spacers bonded to it is permanently positioned with respect to the comb. The other maser slab 31 on the other side of the comb fingers, however, is not rigidly positioned and can walk away along the comb.

Figure 8:
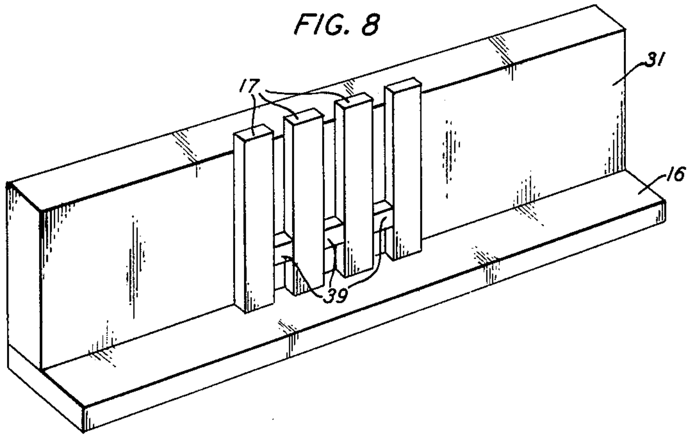
FIG. 8 shows an arrangement for preventing walking of the maser material.

The device used to position the second maser slab is illustrated in FIG. 1 and, in close-up in FIG. 8. It comprises a number (approximately six) of ceramic spacers 39 bonded to the maser slab 31 in the region near the shortcircuited end of the comb fingers 17. The spacers 39 fill the space between adjacent fingers and rigidly position the slab with respect to the comb structure. This device has been incorporated into numerous maser amplifiers and has prevented distortion in the maser structure which otherwise would occur after repeated thermal cycles.

The several improvements now to be described are based upon the electrical properties of the comb structure and, in particular, upon the variations in the field configuration of the signal wave over the pass band of the comb structure.

In the copending application of Schulz-Du Bois et al. referred to above, it is pointed out that the field configurations along the slow-wave structure at the upper and lower cut-off frequencies are distinctly different. In particular, it is pointed out that at the lower cut-off frequency of a forward-wave structure the voltage on adjacent fingers are in-phase and the electric field pattern is as shown in FIG. 9.

Figure 9:
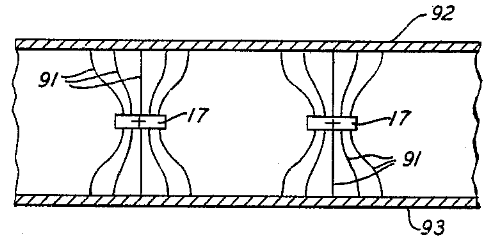
FIGS. 9 and 10 show the electric field distribution along the comb structure at the lower and upper cut-off frequencies for a forward wave structure.

FIG. 9 is an end view of a portion of the slow-wave structure showing the open-circuited end of the comb fingers. The "+" designation on each of the fingers 17 indicates an in-phase relationship for the signal wave. Because of this in-phase relationship, the electric field, indicated by the force lines 91, extends from each finger to the guide walls. In FIG. 9 these are shown extending between two of the fingers and the upper and lower guide walls 92 and 93, respectively.

Figure 10:
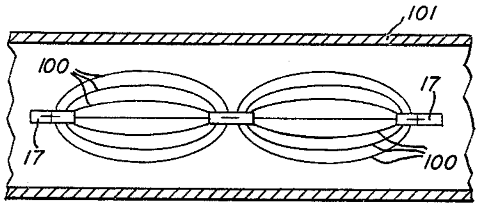

At the upper cut-off frequency of a forward-wave structure, adjacent fingers are 180 degrees out of phase, as indicated by the "+" and "−" designation on adjacent fingers. The electric field distribution is as shown in FIG. 10 wherein the electric force lines 100 extend between adjacent fingers 17 with substantially no electric field extending between the fingers 17 and the adjacent walls 101 or 102.

Because of these distinctly different field configurations, the operating characteristics of the traveling wave maser at the upper and at the lower cut-off frequencies can be substantially independently influenced.

In order to obtain high gain in a traveling wave maser, it is necessary to reduce the group velocity of the signal wave appreciably. This is equivalent to narrowing the pass band of the slow-wave structure. It has been the practice heretofore to lower the upper cut-off frequency of the slow-wave structure by placing a high dielectric material, such as rutile, immediately adjacent to the comb fingers, thereby increasing the finger-to-finger capacitance without materially increasing the finger-to-wall capacitance. However, this technique has not proved satisfactory. Because of the high dielectric constant of the rutile material (35 to 100), slight changes in spacing between any of the fingers and the rutile material has resulted in large changes in the finger-to-finger capacitance. The net effect has been a slow-wave structure in which finger-to-finger capacitance varies along the comb. In addition, the high dielectric constant material causes high current densities on the adjacent comb fingers. This results in higher ohmic losses and, in the case of mechanical imperfections, exaggerated electrical reflections and erratic transmission. Furthermore, the dielectric constant of rutile varies as a function of temperature.

In accordance with the invention, these difficulties have been obviated by removing the rutile material and increasing the finger-to-finger capacitance by reducing the height of the comb fingers. The extent to which the upper cut-off frequency is lowered depends upon the extent to which the height of the fingers is reduced. There are, however, mechanical limitations to this technique. Too small a finger height results in a structure that is physically weak and difficult to fabricate and maintain. In addition, the copper loss increases as the cross-sectional dimensions of the fingers decrease. Hence, where the comb is separately constructed useful height-to-width ratios typically lie between 0.1 and 0.8. [One specific embodiment operating from between 2.4 kilomegacycles per second and 3.0 kilomegacycles per second utilized 40 mil by 20 mil fingers (for a height-to-width ratio of 0.5) spaced 80 mils apart.] However, using printed circuit techniques, the height-to-width ratio can be further reduced below 0.1.

It is a further advantage of comb structures using reduced height fingers that they are easier to fabricate than those using high dielectric materials in that there is a substantial saving in the number of machining operations that are necessary for bonding and shaping the high dielectric constant material. In addition, they are less prone to "foldover." The effects of foldover are discussed in the July 1961 issue of the Bell System Technical Journal, pages 1117 through 1127. As pointed out therein, foldover renders a maser useless. Thus, a maser in accordance with the invention permits a higher degree of slowing and, hence, more gain, than the prior art techniques.

Figures 11, 12:
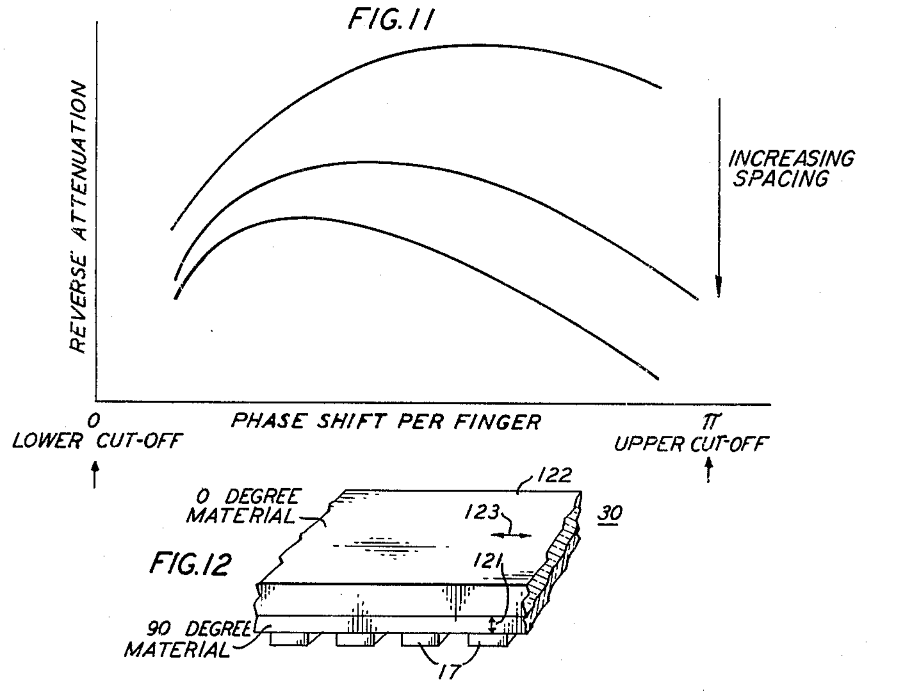
FIG. 11 shows the variations in reverse attenuation across the pass band as the spacing between the fingers and the gyromagnetic material is varied.
FIG. 12 shows a portion of the composite maser slab and its composition.

The same field configuration variations described above influence the performance of the gyromagnetic isolator. In general, the reverse attenuation increases across the band as the distance between the gyromagnetic material and the fingers is reduced. This is illustrated in FIG. 11 which shows the reverse attenuation characteristic for three different spacings. It will be noted that the loss characteristic tends to peak at the lower frequencies for the larger spacings and at the higher frequencies for the smaller spacings.

While the smaller spacing tends to have the higher reverse attenuation over the band than the larger spacing, the forward loss is also larger. Accordingly, it is preferable to utilize primarily the larger spacing for the isolator and add just enough gyromagnetic material at the smaller spacing to peak the reverse loss at the higher end of the band. This latter combination of isolator spacings gives a reverse attenuation that is adequate and substantially uniform across the band while still maintaining minimum forward loss.

In the illustrative embodiment of the invention shown in FIG. 1 and FIG. 1A, one row of gyromagnetic disks is spaced a distance $d_1$ from the fingers and a second row, containing fewer disks of gyromagnetic material, is spaced a smaller distance $d_2$ from the fingers. In practice, the second row would typically contain fewer disks in an effort to minimize the forward loss. Alternatively, one row of disks at distance $d_2$ can be combined with two rows of disks spaced a distance $d_1$, where an equal number of disks are used in each of the three rows. One embodiment of the invention constructed and operated at L-band, using the latter arrangement of gyromagnetic material, contained one row of disks spaced 8 mils from the comb fingers and two rows spaced 15 mils.

The variation in the signal field configuration also has an effect upon the interaction of the maser material and the signal. In the Third Quarterly Report, Contract DA-36-039-sc-85357, prepared by the Bell Telephone Laboratories, Incorporated, for the United States Army Signal Supply Agency, it is pointed out that the maser material with the crystalline $c$-axis parallel to the longitudinal axis of the slow-wave structure (0 degree material) is more effective at the lower frequencies than 60 degree material. It has since been discovered by W. J. Tabor that the maser gain using 0 degree material tends to decrease with increasing frequency, whereas the maser gain using material having the crystalline *c*-axis perpendicular to the structure axis (90 degree material) tends to increase with increasing frequency. In accordance with the invention, optimum gain is obtained by using a composite maser slab containing an inner portion of 90 degree material and an outer portion of 0 degree material.

This is illustrated in FIG. 12 which shows a portion of the slow-wave structure and one of the slabs of maser material. In accordance with the invention, the inner portion 120 of slab 30 immediately adjacent to the fingers 17, is 90 degree material as indicated by the double-headed arrow 121 and the outer portion is 0 degree material as indicated by the double-headed arrow 123.

Referring again to FIG. 10, it is noted that the electric field is concentrated in the vicinity of the comb fingers at the high end of the pass band. Hence, the 90 degree material, which gives greater gain at the higher frequencies, is made to occupy only a portion of the total volume of the maser material. Typically, the inner 5 to 35 percent of the total volume of the maser material is 90 degree ruby.

The remaining outer portion of the maser material is made of 0 degree ruby. From FIG. 9 it is seen that the field at the lower end of the band terminates at the guide wall. Hence, the outer portion of the maser material is preferably made of 0 degree ruby which tends to give higher gain at the lower frequencies. So constructed, the gain of the maser tends to remain more nearly constant over the entire pass band.

(In the backward wave structure the 0 degree material tends to improve the gain at the higher frequencies and the 90 degree material gives improved gain at the lower frequencies. However, in either case, the physical construction of the slab remains as explained above.)

While the maser material 30 is shown as a uniform rectangular block in FIGS. 1 and 12, the end adjacent to the open-circuited end of the fingers can be tapered for band shaping purposes, as taught in the copending application of Schulz-Du Bois et al. referred to hereinabove. Thus, it is to be understood that the above-described arrangement is simply illustrative of but one of the many possible specific embodiments which represent applications of the principles of the invention. Numerous and varied other arrangements can readily be devised in accordance with these principles by those skilled in the art without departing from the spirit and scope of the invention.

What is claimed is:

1. A traveling wave maser amplifier comprising:
a comb-type slow-wave structure having a plurality of fingers disposed between a pair of slabs of maser material,
said fingers being unsupported at one end and supported at their other end and having a tendency to move relative to each other with changes in temperature,
and means for maintaining uniform finger spacing despite this tendency for relative movement as the temperature of said amplifier is varied over a range of temperatures between room temperature and cryogenic temperatures comprising a plurality of spacers disposed between adjacent fingers at their unsupported end,
said spacers being in contact with said adjacent fingers and bonded to an end of one of said slabs.

2. The combination according to claim 1 including:
additional means for maintaining said comb structure and the other of said slabs in fixed relative positions comprising a plurality of additional spacers bonded to said other slab and disposed between adjacent comb fingers at their supported end.

3. A traveling wave maser amplifier comprising:
a comb-type slow-wave structure having a plurality of fingers disposed between a pair of composite slabs of maser material,
said fingers being unsupported at one end and supported at their other end,
each of said slabs comprising an inner portion of 90 degree maser material adjacent to said slow-wave structure and an outer portion of 0 degree maser material,
means for maintaining uniform finger spacing between adjacent fingers as the temperature of said amplifier is varied over a range of temperatures between room temperature and cryogenic temperatures comprising a first plurality of low-loss dielectric spacers disposed between adjacent fingers and bonded to the end of one of said slabs adjacent to the unsupported end of said fingers,
and means for maintaining said comb structure and the other of said slabs in fixed relative positions comprising a second plurality of additional spacers bonded to said other slab and disposed between adjacent comb fingers at their supported end.

4. A traveling wave maser amplifier comprising:
a section of rectangular waveguide having a pair of narrow and a pair of wide walls,
means for propagating signal wave energy within said guide comprising a comb structure having a coplanar array of parallel conductive fingers,
each of said fingers having one end short-circuited to one of said narrow walls and the other end open-circuited,
a composite slab of maser material having an inner portion of 90 degree maser material and an outer portion of 0 degree maser material positioned between said comb and each of said wide walls with said inner portion contiguous with said fingers,
said material extending longitudinally along said guide over an interval coextensive with said comb,
means for maintaining a uniform spacing between adjacent fingers as the temperature of said amplifier is varied over a range of temperatures between room temperature and cryogenic temperatures comprising a plurality of spacers disposed between and in contact with said adjacent fingers and bonded to an end of one of said slabs adjacent to the open-circuited end of said fingers,
means for maintaining a fixed relative position between said fingers and said other slab as the temperature is varied over said range of temperatures comprising a plurality of additional spacers extending between and in contact with adjacent fingers bonded to said other slab adjacent to the short-circuited end of said fingers,
means for providing nonreciprocal attenuation for opposite directions of signal propagation through said amplifier comprising at least two strips of gyromagnetic elements distributed longitudinally along said comb, the first of said strips being substantially closer to said fingers than the other of said strips,
and means for establishing a steady magnetic field through said maser material and through said gyromagnetic elements.

5. The combination according to claim 4 wherein:
said fingers have a rectangular cross section having a wide and a narrow dimension,
and wherein said narrow dimension extends in a direction perpendicular to the direction of wave propagation and said wide dimension extends in a direction parallel to the direction of wave propagation.

References Cited by the Examiner

UNITED STATES PATENTS

| | | | |
|---|---|---|---|
| 2,823,332 | 2/58 | Fletcher | 333—31 |
| 3,099,806 | 7/63 | Blasberg et al. | 333—24.2 |

OTHER REFERENCES

De Grasse et al.: "Bell System Technical Journal," July 1961, pages 1117–1127.

Schulz-Du Bois: "Bell System Technical Journal, January 1959, pages 271–290 (page 271 relied on).

ROY LAKE, *Primary Examiner*.